UNITED STATES PATENT OFFICE.

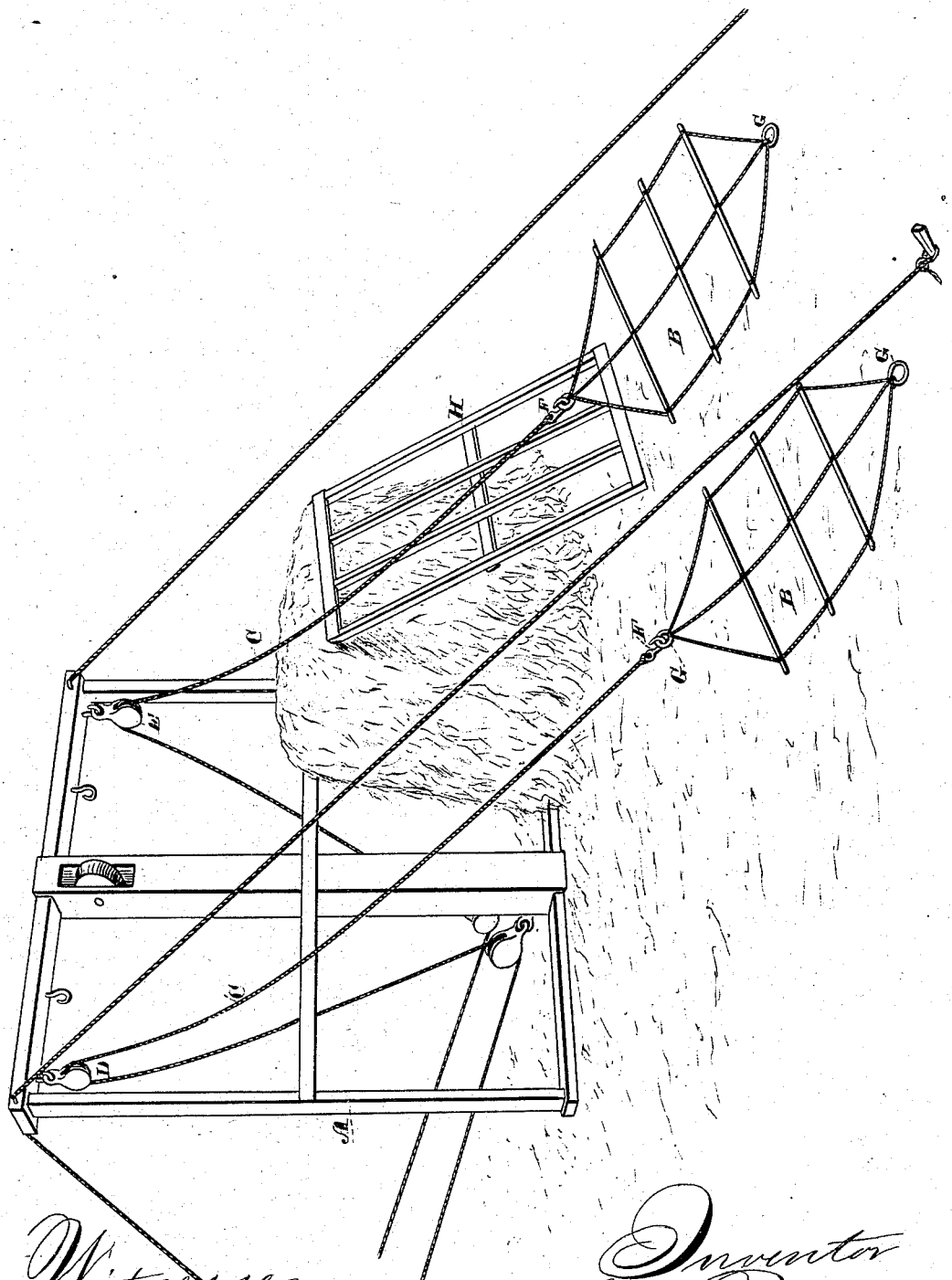

GAMOS RICHARDSON, OF SAN JOSÉ, CALIFORNIA.

HAY-STACKING APPARATUS.

SPECIFICATION forming part of Letters Patent No. 255,887, dated April 4, 1882.

Application filed February 11, 1882. (No model.)

*To all whom it may concern:*

Be it known that I, GAMOS RICHARDSON, of San José, county of Santa Clara, and State of California, have invented a Hay-Stacking Apparatus; and I hereby declare the following to be a full, clear, and exact description thereof.

My invention relates to an improved apparatus for stacking hay in the field; and it consists of a frame-work which is set up on one edge, so as to stand upright, and it is provided with suitable guys or braces to hold it up, and also with pulleys over which two or more ropes lead to attach to the nettings in which the hay is placed, passing thence to guide-pulleys, and to the horses or power by which they are operated.

In combination with the frame, nettings, and ropes I employ ways or guides over which the nettings with their load may be elevated to the top of the stack without rolling devices or any other means for preventing contact, and without a direct lift.

Referring to the accompanying drawing, the figure is a view of my apparatus.

In the operation of stacking hay or grain many different kinds of apparatus have been devised, some of which lift the material bodily with forks or in nets by the aid of derricks, while others take the hay in the net and roll it up the vertical side of the stack, it being necessary in such cases to provide a series of long ropes which lead over the stack and connect with the lower or front edge of the net, while the operating-rope is carried over to connect with the opposite edge. The lower ropes must be laid parallel and must be pulled out and replaced after each net-load has been placed upon the stack, thus consuming much time and needing considerable care.

By my invention I employ a frame, A, of sufficient length, two or more nets, B, at one time or alternately, and ropes C, passing over directing-pulleys D E from the source of power to the top of the frame, and thence down across the stack to the nets B. These nets are formed of parallel strips of wood united by transverse cords. The ends of these ropes are brought together over the load which has been placed in the net, and inclosed so that a hook, F, upon the end of either rope C will take hold of the loops or rings G in the ends of the net-ropes.

In order to raise the load to the position where it is to be deposited upon the top of the stack without either lifting or rolling it, I employ a frame-work, H, of light parallel bars, united by transverse bars sufficiently to hold them together, the bars H being made of any desired length. One end of these guides rests upon the ground near the net and the other rests upon the top of the edge of the stack. Power being applied to the rope C, which is attached to the net, the latter is drawn easily and quickly to the top of the stack without rubbing or dragging against its sides and destroying or injuring its shape, and without undue strain or friction.

Two or more sets of ropes C, with their pulleys, nets, and inclines H, may be operated along the line of the stack from the same frame, so that any number of nets may be drawn up continuously or simultaneously, and the stack rapidly and easily built with the least expenditure of power, as the load does not have to be lifted directly, as in both the other methods. By this means the hay or grain is brought from a certain area and deposited in the nets until a stack is finished and this area cleared. The apparatus is then moved to another point with but little time or trouble, and again set up to repeat the operation. The hay is brought to the nets by horse-rakes, no wagons being used, and consequently it requires no use of forks until it arrives upon the top of the stack, and then but little.

Having thus described my invention, what I claim as new, and desire to secure by Letters Patent, is—

An apparatus for stacking hay and grain, consisting of the frame A, with its direction-pulleys D E, rope C, and nets B, in combination with the inclines H, substantially as and for the purpose herein described.

In witness whereof I hereunto set my hand.

GAMOS RICHARDSON.

Witnesses:
 PHILIP ANDERSON,
 THOMAS BECK.